US006538869B1

(12) United States Patent
Lee et al.

(10) Patent No.: US 6,538,869 B1
(45) Date of Patent: Mar. 25, 2003

(54) PROTECTION SWITCH ARCHITECTURE FOR DIGITAL CROSS-CONNECT SYSTEM

(75) Inventors: Hung Lee, Naperville, IL (US); Nhat Quang Pham, Schaumburg, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/557,927

(22) Filed: Apr. 22, 2000

(51) Int. Cl.[7] .............................................. H01H 73/00
(52) U.S. Cl. ......................... 361/115; 361/100; 361/18
(58) Field of Search ................................. 361/100, 115, 361/18

(56) References Cited

U.S. PATENT DOCUMENTS 5,239,537 A * 8/1993 Sakauchi ..................... 370/16
5,953,333 A * 9/1999 Fox et al. ................... 370/360

* cited by examiner

Primary Examiner—Stephen W. Jackson
(74) Attorney, Agent, or Firm—Walter W. Duft

(57) ABSTRACT

A protection switch architecture is disclosed for a digital cross-connect system having a main controller, a command interface, and at least one digital signal processing unit. The digital signal processing unit includes one or more signal processing service devices and one or more signal processing protection devices that correspond to the service devices. A unit controller includes the protection switch for switching signal processing responsibilities between the service devices and the protection devices. Advantageously, the protection switch is adapted to act independently of the main controller in reponse to autonomous switching requests from the service devices by completing all protection switching related to such protection requests without main controller involvement. The protection switch also acts in response to manual switching requests from the main controller.

20 Claims, 9 Drawing Sheets

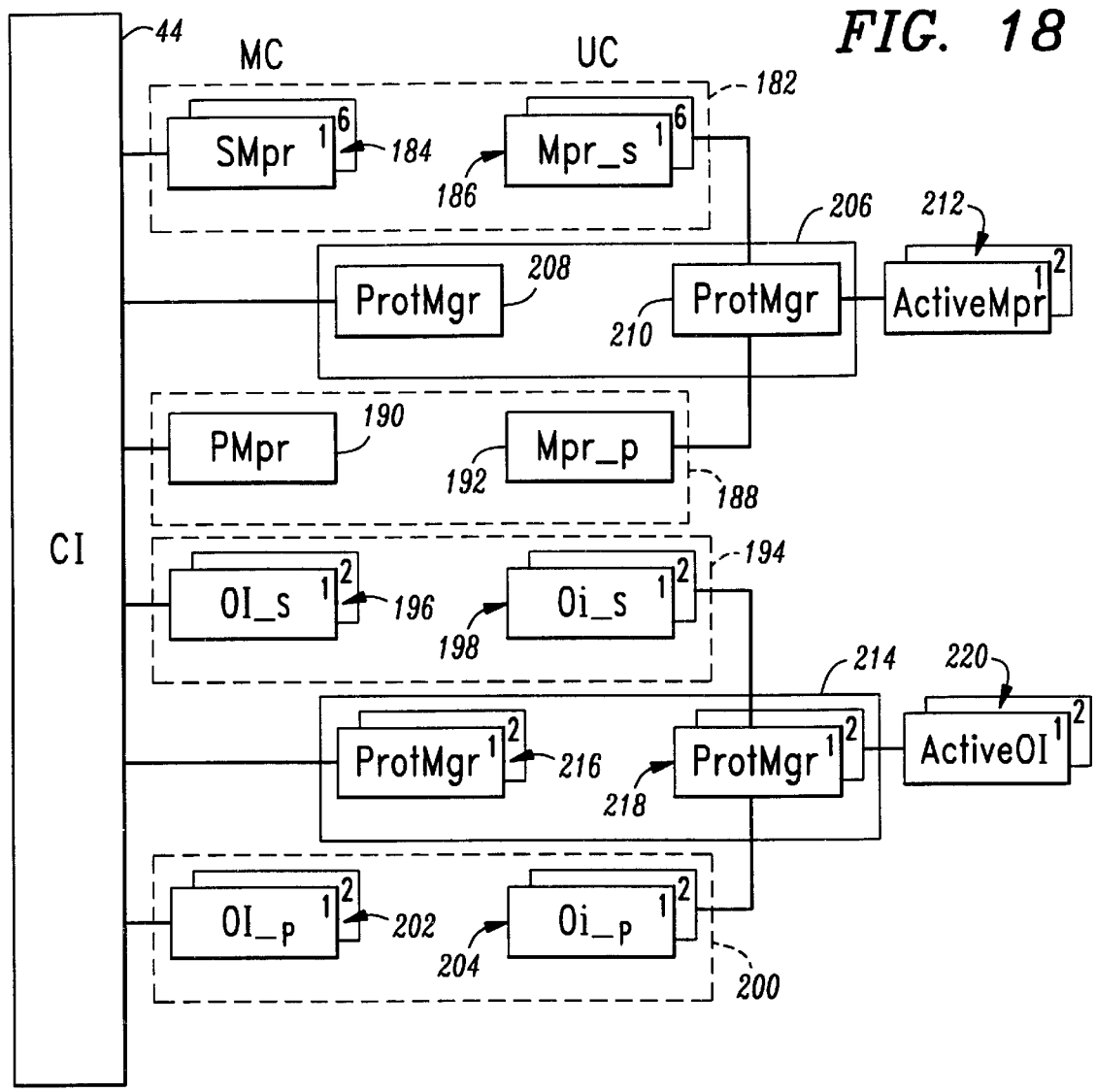

PROTECTION SWITCH ARCHITECTURE FOR DIGITAL CROSS-CONNECT SYSTEM

CROSS-REFERENCE TO RELATED APPLICATIONS

Not Applicable

STATEMENT REGARDING FEDERALLY SPONSORED

Not Applicable

BACKGROUND OF THE INVENTION

1. Field of the Invention

The field of the present invention is digital cross-connect systems. More particularly, the invention relates to protection switching in a digital cross-connect system signal processing unit.

2. Description of the Prior Art

Digital cross-connect systems are used in digital networks to make interconnections between multiple signal carrying links at the channel level. Such systems conventionally include a Main Controller (MC) and at least one signal processing unit adapted to perform multiplexing, demultiplexing and interworking of incoming signal traffic. The signals may be formatted according to traffic protocols such as SDH (Synchronous Digital Hierarchy), SONET (Synchronous Optical Network), or PDH (Pleisochronous Digital Hierarchy). As is well known in the art, the signal processing unit includes various digital signal processing devices, typically embodied as circuit packs, that perform the required functions. These devices may include link interfaces, mappers, formatters and cross-connect networks. A Unit Controller (UC) typically implements local control functions in the signal processing unit under authority of the MC.

To improve system reliability, multiple copies of each signal processing device can be incorporated in a signal processing unit to provide device redundancy. One or more copies of each signal processing device can act as "protection" devices for the remaining copies of the device, which are known as "service" devices and which represent a "failure group." A Protection SWitch (PSW) provides a control mechanism for switching between a service device and a protection device. This switching can be performed in response to both manual provisioning commands from a system administrator and autonomous requests generated as a result of hardware errors or network (facility) problems. In prior art digital cross-connect systems, all PSW requests, whether they are manual or autonomous in nature, are processed by the MC, which maintains a system-wide PSW database containing all system state information, including the identity of the active signal processing devices of each signal processing unit in the digital cross-connect system. The UC also maintains a local PSW database that identifies the active signal processing devices that it directly oversees. These databases must be coordinated in order for PSW processing to work effectively.

When the MC receives a provisioning command, it sends a corresponding PSW request to a UC, which implements the PSW operation. The PSW databases in the MC and the UC must then be updated to reflect the change of active signal processing devices. A different protection switch procedure is used when hardware error recovery processing is invoked or when network problems arise. In those cases, the device being affected by the hardware error or network problem first notifies the responsible UC, which performs a "fast switch" PSW operation. A fast switch is a PSW operation performed without MC involvement in the switch decision making process. After the fast switch is performed, the UC sends a message to the MC advising it of the fast switch and requesting the MC to lock its PSW database. After locking the database, the MC forwards a PSW request to the UC to perform a normal "slow switch" PSW operation. A slow switch is a PSW operation performed at the request of the MC. After the slow switch is performed, the MC updates and synchronizes both the MC and the UC databases.

It will be seen that the error recovery scenario described above requires duplicative PSW actions. Moreover, a potential race condition and deadlock situation may result from the UC having to serve both fast switch and slow switch PSW requests. Accordingly, there is a need in the digital cross-connect system art for a protection switch that does not suffer from these disadvantages. What is required is a protection switch architecture that implements both manual and autonomous PSW commands without redundant processing and the inherent difficulties of fast and slow PSW switching.

SUMMARY OF THE INVENTION

The foregoing problems are solved and an advance in the art is obtained by a novel protection switch architecture for a digital cross-connect system of the type which has a main controller, a command interface, and at least one digital signal processing unit. The digital signal processing unit includes one or more signal processing service devices and one or more signal processing protection devices that correspond to the service devices. A unit controller includes the new protection switch of the invention for switching signal processing responsibilities between the service devices and the protection devices. Advantageously, the protection switch is adapted to act independently of the main controller in response to autonomous protection requests from the service devices by completing all protection switching related to such protection requests without main controller involvement. The protection switch also acts in response to manual switching requests from the main controller.

In preferred embodiments of the invention, protection switch control functions are implemented in an object oriented software environment by a protection manager object, one or more service objects associated with the service devices, and one or more protection objects associated with the protection devices. The foregoing objects each preferably include a main controller half-object residing in the main controller and a unit controller half-object residing in the unit controller. Other half-objects, representing signal link facility objects, may be distributed between the unit controller and processors in the service and protection devices.

DETAILED DESCRIPTION OF THE DRAWINGS

The foregoing and other features and advantages of the invention will be apparent from the following more particular description of preferred embodiments of the invention, as illustrated in the accompanying Drawing, in which:

FIG. 18 is a functional block diagram showing distributed software objects in accordance with the distributed processor model of FIG. 17; and FIG. 19 is a functional block diagram showing a shared-memory mechanism used for communication between half object pairs.

DETAILED DESCRIPTION OF THE PREFERRED EMBODIMENT

HARDWARE ARCHITECTURE

Figure 1:
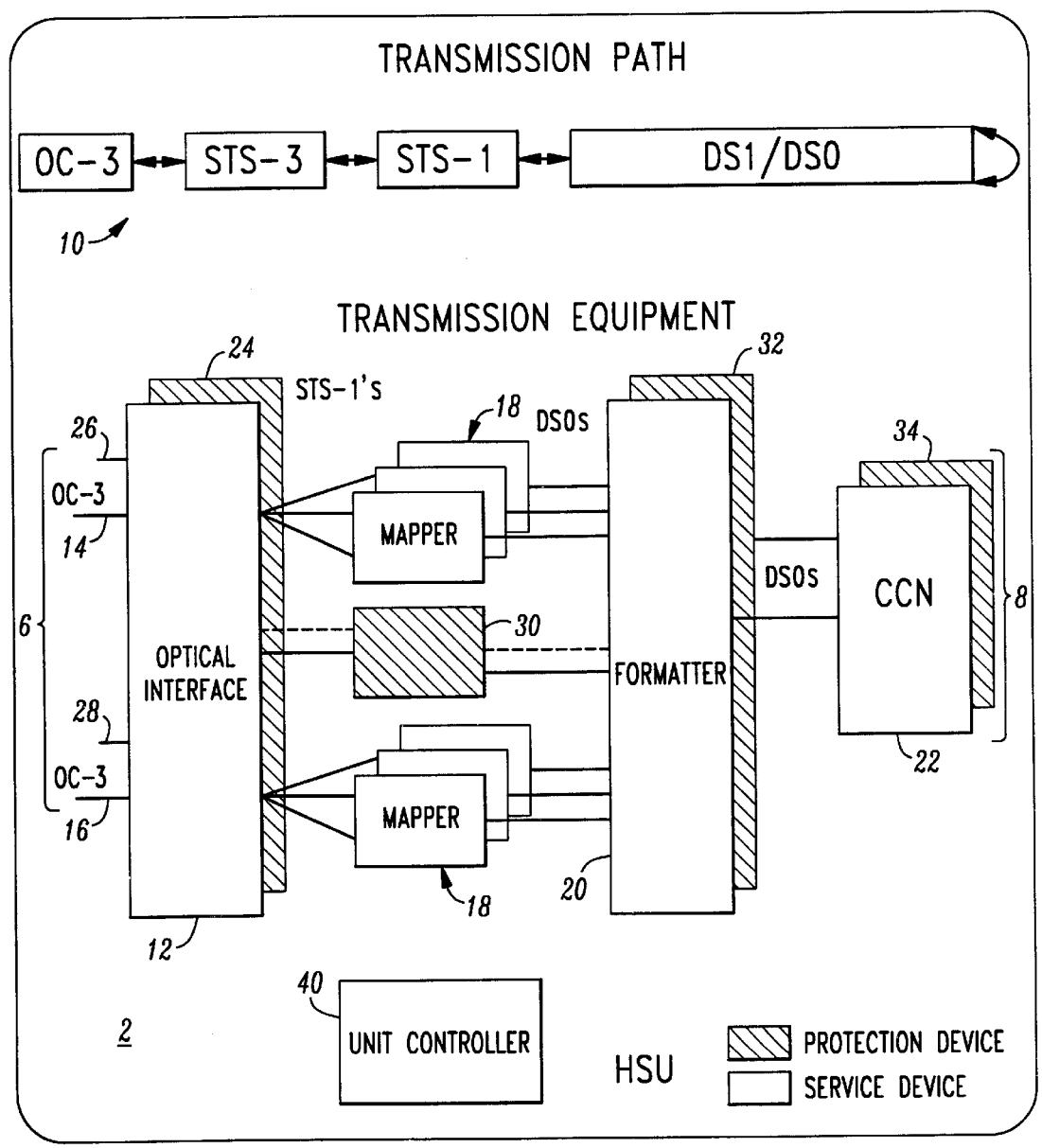
FIG. 1 is a functional block diagram showing an exemplary signal processing unit constructed in accordance with the invention for use in a digital cross-connect system.
Figure 2:
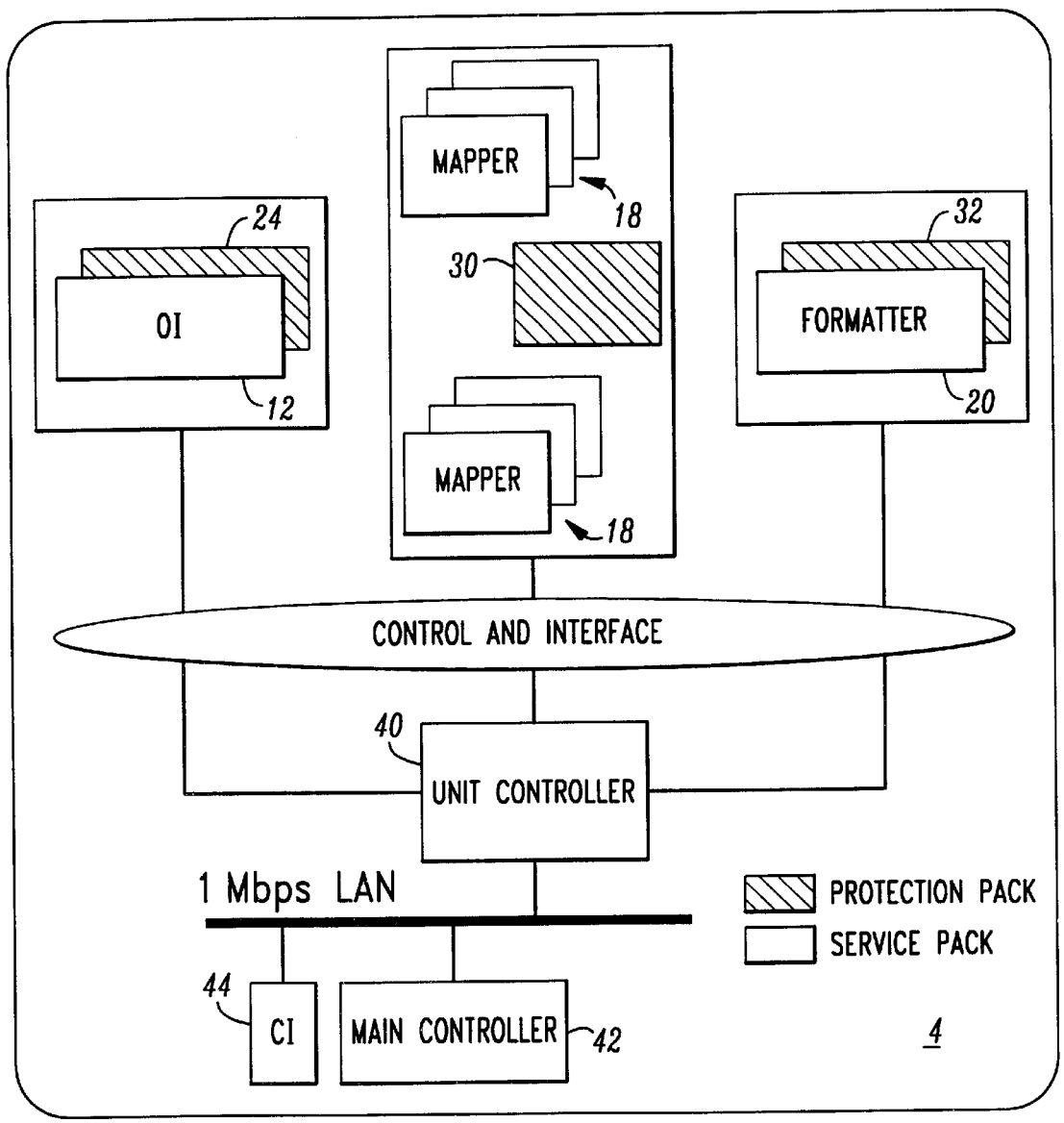
FIG. 2 is a functional block diagram showing the signal processing unit of FIG. 1 in combination with a digital cross-connect system main controller and command interface.

Turning now to the figures, wherein like reference numerals represent like elements in all of the several views, FIGS. 1 and 2 illustrate a digital signal processing unit 2 configured for use in a digital cross-connect system 4. One exemplary product that could be used to implement the system 4 is the DACS II™ Digital Cross-Connect System from Lucent Technologies, Inc. As described in more detail below, the novel protection switch of the invention may be implemented in the DACS II™ system by programming new protection switch control software into the UC and MC processors of that system. In the embodiment of FIGS. 1 and 2, the signal processing unit 2 is adapted to support OC-3 (Optical Carrier-3) optical connections on a first side 6 of the signal processing unit and DS0 terminations on a second side 8 of the signal processing unit. Because the first side 6 of signal processing unit 2 enables the digital cross-connect system 4 to terminate optical signals at the OC-3 rate of 155.52 Mbit/s, the signal processing unit will be referred to hereinafter as a High Speed Unit or HSU 2. In FIG. 1, it is assumed by way of example that the OC-3 connections carry SONET (Synchronous Optical NETwork) STS-3 (Synchronous Transport Signal level 3) signals. It will be appreciated that the first side 6 of the HSU 2 could also be modified to terminate optical connections in accordance with the Synchronous Digital Hierarchy (SDH) STM-1 (Synchronous Transport Module level 1) protocol (which uses the same 155.52 Mbps bit rate). The first side 6 of the HSU could likewise be modified to handle DS3 or E3 terminations, depending on network needs. It could also terminate STS-1 signal connections. In any event, when an incoming signal is de-multiplexed into lower level signals, such as DS1 or DS0, the lower level signal are treated no differently than the same types of signals transmitted by other signal processing unit types. It will be further appreciated that all types of cross-connections may be supported.

With two OC-3 connections on the first side 6, the HSU 2 can carry up to 4096 DS0 signals at the second side 8. FIG. 1 shows the signal processing service devices (Transmission Equipment) of the HSU 2 and a high level view 10 of the signal processing that occurs along the path (Transmission Path) between the OC-3 signal terminations at side 6 of the HSU 2 and DS0 signal terminations at side 8 of the HSU 2. An Optical Interface device 12 provides optical interfaces that terminate two OC-3 service links 14 and 16 (also known as OI facilities). As stated above, each OC-3 service link 14 and 16 carries an STS-3 (Synchronous Transport Signal level 3) signal to the Optical Interface 12 at the side 6 of the HSU 2. The Optical Interface 12 de-multiplexes the STS-3 signal into three STS-1 (Synchronous Transport Signal level 1) signals. Each STS-1 signal is sent to one of six associated Mapper devices 18 which process the signal overhead, and de-multiplex the STS-1 signals into DS1 and DS0 signals. These signals are transmitted via a Formatter (FMT) device 20 to a cross-connection network (CCN) device 22 for cross-connection processing. In the reverse direction, the signals travel from the CCN 22 through the Formatter 20, through one of the Mappers 18, and to the Optical Interface 12.

The shaded blocks in FIG. 1 are protection devices that provide redundancy to the above described service devices. Thus, in addition to the service Optical Interface 12, there is a protection Optical Interface 24. There are also protection links 26 and 28 respectively corresponding to the service links 14 and 16. Optical Interface 12 is permanently connected to the service links 14 and 16 and Optical Interface 24 is permanently connected to the protection links 26 and 28. As a result, each OC-3 traffic stream is fully protected by a pair of service links terminating at the different Optical Interfaces 12/24. This allows both network (facility) protection and equipment (hardware) protection. A PSW operation may be triggered either by a service link (facility) failure or a device (hardware) failure. If a hardware error occurs, the service and protection Optical Interfaces 12/24 can switch roles. This switching can be performed relative to one service link (e.g., 14) independently of the other service link (e.g., 16) or relative to both service links at the same time (e.g., 14 and 16). For example, the Optical Interfaces 12/24 could be switched with respect to service links 14/26, but not with respect to service links 16/28. In that case, the Optical Interface 12 would continue to actively support the service link 16. If a facility error occurs on one of the service links (e.g., 14), a switch can be made to its protection link (e.g., 26). The service links can be switched independently of each other (e.g., 14/26 are switched but 16 remains the same), or together (e.g., both 14/26 and 16/28 are switched).

Protection for the six service Mappers 18 is provided by a protection Mapper 30. The protection Mapper 30 is shared by all of the service Mappers 18 in a 6:1 protection scheme. Thus, at most one service Mapper 18 is protected at a time. A protection Formatter 32 provides protection for the service Formatter 20. This pair of Formatters is connected to all the service Mappers 18 and to the protection Mapper 30. There is also a protection CCN 34 that protects the service CCN 22. Each of the Formatters 20/32 connects to one of the CCNs 22/34.

Switching active signal processing between a service device and its associated protection device may be referred to as switching from the service side to the protection side. The inverse operation is referred to as switching from the protection side to the service side. The Optical Interfaces 12/24 and the Mappers 18/30 can switch between the service side and the protection side without impacting other equipment. The Formatters 20/32 and the CCNs 22/34 must switch sides together. Thus, if the CCNs 22/34 switch from one "side" to the other, the Formatters 20/32 will also switch sides. In addition, a switch between the CCNs 22/34 of one signal processing unit, such as the HSU 2, will cause all of the Formatters 20/32 in other signal processing units to switch sides as well. In a similar vein, if the Formatters 20/32 of a particular signal processing unit switch sides, the switch will cause the CCNs 22/34 and the Formatters 20/32 in all of the signal processing units to switch sides.

In addition to the signal processing devices described above, the HSU 2 has a Unit Controller (UC) 40 that interfaces to a Main Controller (MC) 42, as shown in FIG. 2. The MC 42 maintains high level control over the HSU 2, as well as other signal processing units in the digital cross-connect system 4, if present. It also communicates with a conventional Craft Interface (CI) 44 that is operated by a system administrator.

FIG. 2 illustrates the control hierarchy of the digital cross-connect system 4. The UC 40 communicates with the MC 42 via a 1 Mbps LAN 46. The UC 40 effectively isolates the HSU 2 from the rest of the digital cross-connect system 4. Other than the CCNs 22/34, the UC 40 has direct access to all of the above-described transmission equipment, including the Optical Interfaces 12/24, the Mappers 18/30, and the Formatters 20/32. The UC 40 has the ability to directly read and write to the registers of these devices. There is also a shared Control and Interface memory 48 that may be used for bi-directional communication between the UC 40 and the HSU signal processing devices.

The Optical Interfaces 12/24 and the Mappers 18/30 are intelligent devices that can communicate with the UC 40 via interrupts. Each has an on-board processor. The Formatters 20/32 are dumb cards that are provisioned and controlled by the UC 40.

By virtue of their software programming (described in more detail below), the UC 40 and the MC 42 have the responsibility for provisioning, initialization, operation and maintenance in the digital cross-connect system 4. The signal processing devices of the HSU 2 are responsible for performance monitoring, alarm detection, and transmission signal processing of the signals terminated to the HSU. The UC 40 and the MC 42 can be removed from service without impacting any on-going data transmissions. Typically, a signal processing device can be removed from service only if a protection device is available. As is conventional, however, the Optical Interfaces 12/24 and the Mappers 18/30 can always be forced out of service by commands entered at the CI 44.

In accordance with the invention, PSW operations for the Optical Interfaces 12/24 and the Mappers 18/30 of the HSU 2 are controlled and coordinated by the UC 40. The UC 40 decides when and which device to switch and the conditions under which switching will occur. This decision making is performed autonomously of the MC 42, although the MC 42 may still forward manual PSW requests to the UC 40. In addition, the UC 40 reports to the MC 42 when a PSW operation is performed so that the MC can synchronize its PSW database (not shown) to the UC's database (not shown). In this way, only one PSW action needs to be performed no matter whether the request arises from a manual command, a hardware error recovery, or a network problem. The UC 40 will no longer perform a "fast switch" and then report to the MC 42 for further instructions. Instead, all PSW actions relative to the Optical Interfaces 12/24 and the Mappers 18/30 are coordinated by the UC process software, described in more detail below. The responsibilities of the MC's PSW process software for these devices are reduced to checking pre-PSW and post-PSW conditions, forwarding Craft commands from the CI 44 to the UC 40, receiving PSW results from the UC 40, updating the MC database to synchronize to the UC state, and acknowledging the database update to the UC. Preferably, the MC 42 also remains in control of protection switching for the CCNs 22/34 and the associated Formatters 20/32. The MC 42 is also responsive to queries regarding the protection states of all devices in the HSU 2 (and other HSUs).

Simply stated, the new PSW strategy of the invention is to rely on only one decision maker for the protection switching of certain devices, and thus eliminate potential race conditions while ensuring database consistency between the MC 42 and the UC 40 without triggering any redundant actions.

SOFTWARE ARCHITECTURE

Turning now to FIGS. 3–11, the software architecture implemented by the UC 40 and the MC 42 to implement a PSW in accordance with the invention will now be described. The software comprises programming code recorded on a suitable data storage medium. The discussion which follows focuses on a number of object oriented software objects that will be referred to as "actors," and the relationships among the actors. These two aspects together define how the system is partitioned, how the components are organized, and how the tasks are carried out. Each actor is a software object having its own logical thread of control. Like any object-oriented object implementation, an actor has two aspects, structure and behavior. The structure of an actor specifies "ports" to which the actor may communicate. A port functions according to a protocol that defines the types of messages the actor may send and receive. The structure of an actor also specifies what other actors the actor may contain and the bindings among the contained actors.

Figure 3:
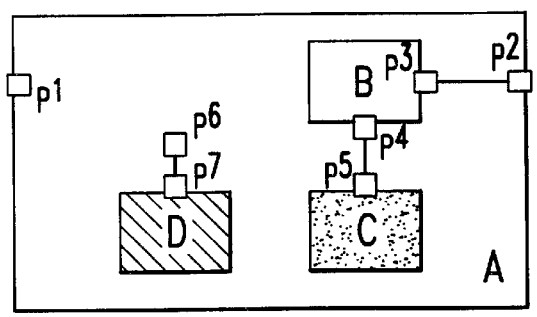
FIG. 3 is a functional block diagram showing an actor software object as used to implement the present invention.

FIG. 3 provides an example. In this diagram, the actor "A" has two communication ports "p1" and "p2." Actor "A" also contains three actors "B," "C" and "D." Actor "B" is a contained actor within actor "A" and handles certain responsibilities for actor "A." Any messages sent to actor "A" via port "p2" go directly to actor "B" via its port "p3." Port "p4" of actor "B" is connected to port "p5" of actor "C," which is an "imported" actor. An imported actor is an actor that is separately defined but is brought into the scope of a containing actor when needed. Importation allows a single actor to exist at multiple places within the software architecture at the same time. It also allows dynamic bindings. For example, by "deporting" actor "C" from actor "A" and importing another actor that is compatible with actor "C," the actor "B" will be allowed to communicate with different actors at different times. Actor "D" is an "incarnated" actor that is dynamically created by its containing actor "A." Actor "A" has an internal port "p6" that communicates with port "p7" of actor "D." Incarnation is used for activating and deactivating capabilities on demand.

Figure 4:
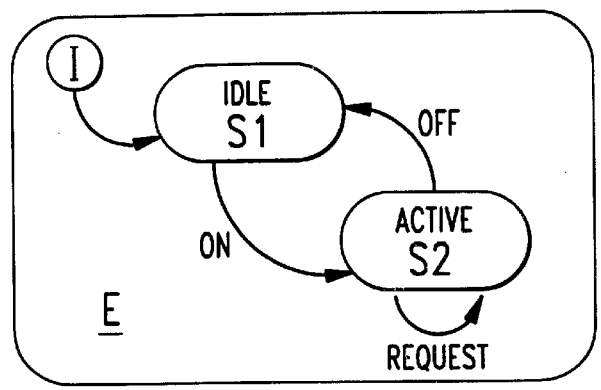
FIG. 4 is a state diagram showing exemplary state transitions in an actor software object.

The behavior aspect of an actor specifies how the actor reacts to messages and events. This behavior can be represented as a state-transition diagram with actions (i.e., detailed code) associated with both states and transitions. FIG. 4 shows an example in which the behavior of an actor "E" has two states: an idle state "S1" and an active state "S2." When the actor "E" is first initialized, it enters the idle state "S1." The message "on" moves the actor to the active state "S2." The message "off" moves it back to the idle state "S1." Requests are processed when the actor "E" is in the active state "S1" but ignored in the idle state "S2." Actors, such as the actor "E," thus react to events and are modeled as finite state machines.

Although various object-oriented programming resources could be used to define and implement the actors described herein, a preferred tool is the ObjectTime Developer product for the C++ programming language. This product is commercially available from Object Time Limited of Kanata, Ontario, Canada.

The actors in the object-oriented domain that define PSW operations may be separated into the sub-domains of Provisionable Entities, Board Controllers, Facilities, and Protection Switch Entities. Each of these sub-domain actors is described hereinafter.

PROVISIONABLE ENTITIES

Provisionable entities represent the system devices that can be provisioned. A provisionable entity has three states and is configurable by a system administrator via provisioning commands. The states of a provisionable entity are "in-service" (ins), "out-of-service" (oos) and "unequipped" (ueq). The provisioning commands that may be used with provisionable entities are "grow" (i.e., declare the existence of a provisionable entity and specify its type), "restore" (i.e., bring a provisionable entity into service), "remove" (i.e., remove a provisionable entity from service), "de-grow" (i.e., remove a provisionable entity completely from the system), and "change" (i.e., change the property of a provisionable entity). The provisionable entities also respond to the UC 40 during protection switches that place the provisionable entities in and out of service. The provisionable entities together represent the signal processing configuration of a digital cross-connect system. Protection is provided at this level, i.e., spares are available for fault-tolerant provisionable entities.

Figure 5:
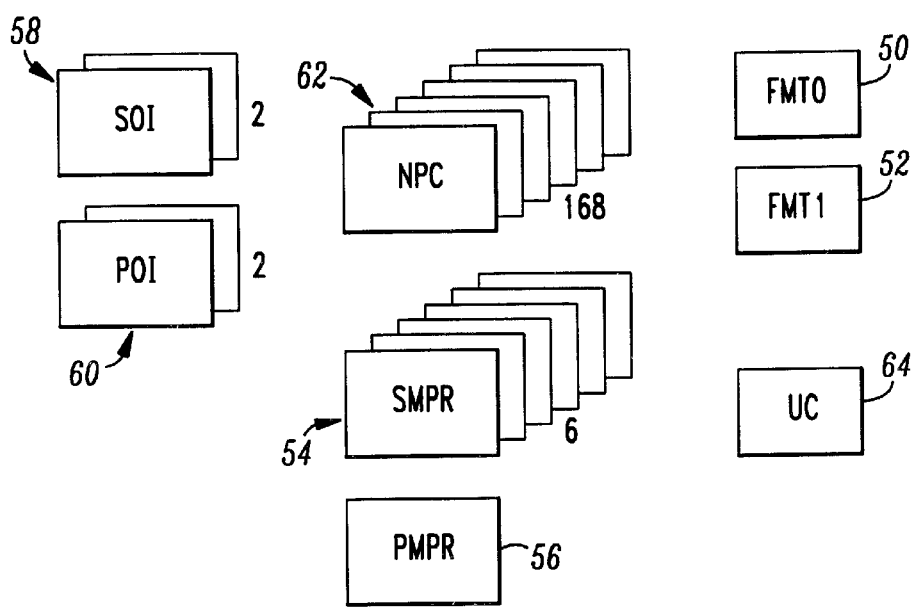
FIG. 5 is a functional block diagram showing software objects representing provisionable entity actors in the signal processing unit of FIG. 1.

Each provisionable entity is represented by an actor in the software architecture. A provisionable entity actor is the software object that represents and manipulates the corresponding physical provisionable entity. The provisionable entity actors for the HSU 2 are shown in FIG. 5. They include two Formatter (FMT0 and FMT1) actors 50 and 52, six service Mapper (SMPR) actors 54, one protection Mapper (PMPR) actor 56, two service Optical Interface (SOI) actors 58 (one for each service OC-3 link), two protection Optical Interface (POI) actors 60 (one for each protection OC-3 link), and 168 NPC (Network Processing Circuit) actors 62. The NPC actors 62 correspond to NPC transmission devices (not shown) located within the Mappers 18/30 to support DS1 (or E1) facilities. Each Mapper in the HSU 2 has 28 DS1 NPCs, bringing the total number of NPCs (and NPC actors) to 168. If E1 NPCs were installed in the Mappers 18/30, there would be 21 NPCs per Mapper.

Each of the foregoing provisionable entity actors, save for the formatter actors 50 and 52, is mapped to a set of transmission devices that together support a particular transmission concept (e.g., STS-3, STS-1, DS1). In addition, there is also a UC actor 64 that is mapped to the UC 40, although the latter is not a traffic carrying device. Each provisional entity mapped by a provisionable entity actor resides on a physical circuit pack, but is not a circuit pack itself. Each may have a spare for protection, if it is carrying traffic.

In some cases, a provisionable entity may correspond to a single hardware circuit pack (i.e., a board). Provisioning commands issued to the provisionable entity will then be tightly coupled with the actual operation of the circuit board. In other cases, a single circuit board may support multiple provisionable entities, as well as multiple types of provisionable entities. For instance, the two Optical Interfaces 12/24 in the HSU 2 may reside on a single Optical Interface card.

Similarly, the seven Mappers 18/30 in the HSU 2 may all reside on a physical Mapper board. This device integration changes the semantics of provisioning commands such as "restore" and "remove," and requires introduction of another concept, the "board controller," described in more detail below.

As stated, in addition to being closely related to the underlying hardware, each provisionable entity is also related to a transmission concept. Indeed, provisionable entities and the provisional entity actors that map them may sometimes be equated with the signals they support. For instance, the SOI actors 58 and the POI actors 60 each represent an STS-3 signal, the SMPR actors 54 and the PMPR actor 56 each represent an STS-1 signal, and the NPC actors 62 each represent a DS1 (or E1) signal. In realty, such signals are supported by a set of transmission devices residing on a physical board. In order to de-couple the transmission concept from the underlying hardware in the HSU 2, another set of actors, named facilities, is introduced. The facility actors are described in more detail below following the discussion of board controllers. For implementation convenience, these actors may be contained by the provisionable entity actors in accordance with the object model of FIG. 3.

BOARD CONTROLLERS

Because a hardware circuit board may not directly correspond to a provisionable entity, board controller actors are used in the software architecture of the HSU 2 to represent and manipulate the circuit boards. A board is a hardware circuit pack that typically has a set of LEDs, a set of signal processing devices, and possibly an on-board processor. A board controller is a software representation of a hardware circuit pack. It is an actor that has responsibility for initializing the board it controls, downloading software (if there is a processor on the board), diagnosing the board when requested by the UC 40, controlling board LEDs, processing non-facility related hardware interrupts from the board, and providing notification of board conditions to a board's corresponding provisionable entities.

Provisionable entities are related to board controllers in that the physical board on which a provisionable entity resides is controlled by a board controller actor that hosts the provisionable entity (and possibly other provisionable entities). Provisioning operations for a provisionable entity, such as "restore" and "remove," are carried out by its corresponding board controller. The board controller also handles hardware error conditions and provides notification to the UC 40 when a provisionable entity requests protection. More particularly, the board controller for a physical board is responsible for initializing the board (including the downloading of board software), handling board interrupts, performing hardware error detection and analysis, and controlling LEDs. Each board controller has three states; namely, "out-of-service" (oos), "inservice" (ins), and "failed."

Figure 6:
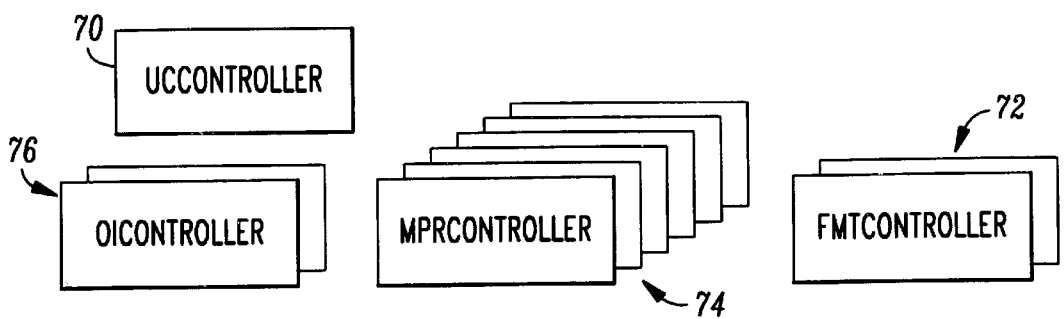
FIG. 6 is a functional block diagram showing software objects representing board controller actors in the signal processing unit of FIG. 1.

As shown in FIG. 6, there are four sets of board controller actors in the HSU 2. These sets include a UC controller (UcController) actor 70, two Formatter controller (FmrController) actors 72 (respectively corresponding to the FMTO actor 50 and the FMT1 actor 52), seven Mapper controller (MprController) actors 74 (corresponding to the SMPR actors 54 and the PMPR actor 56), and two Optical Interface controller (OiController) actors 76 (respectively corresponding to the SOI actors 58 and the POI actors 60). As described in more detail below, the UcController actor 70 resides on both the MC 42 and the UC 40. The remaining board controller actors all reside on the UC 40.

FACILITIES

Facilities represent the transmission signals that are supported by the HSU 2. A facility actor is a software object representation of a facility. It has the responsibility to configure, or to provision, the underlying transmission equipment to support the corresponding transmission protocol. A facility actor is also responsible for signal performance monitoring, facility alarm detection, and facility alarm processing (e.g., network problem handling). Each facility is related to a provisionable entity. A facility actor is created (i.e., incarnated) when a provisionable entity is restored and does not exist when the corresponding provisionable entity is not in service. A facility's class is determined by its corresponding provisionable entity. For the OC-3 protocol, the facility classes are: STS-3, STS-1, VT1.5, and DS1.

Figure 7:
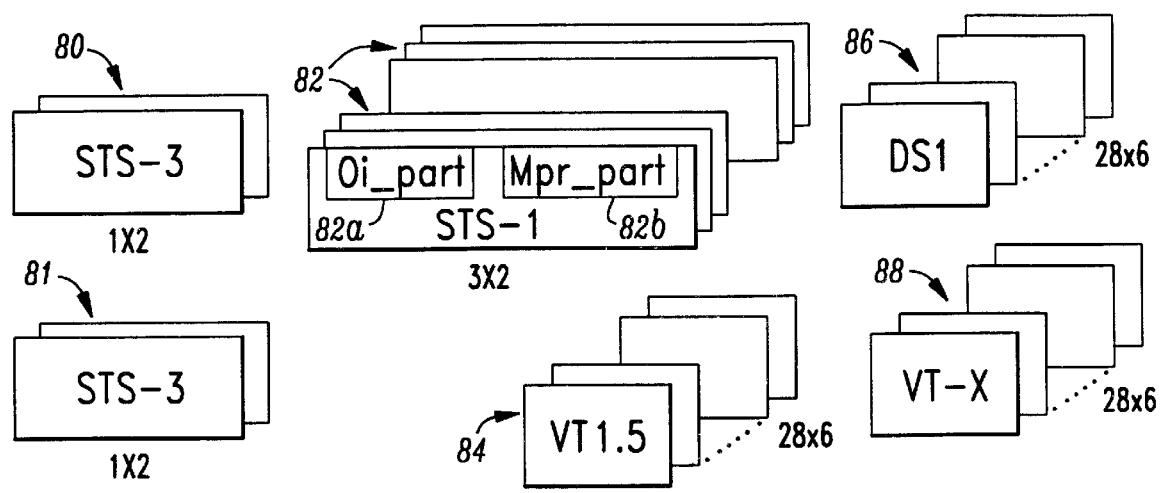
FIG. 7 is a functional block diagram showing software objects representing facility actors in the signal processing unit of FIG. 1.

As shown in FIG. 7, the HSU 2 has two groups of two STS-3 actors 80 and 81, two groups of three STS-1 actors 82, 168 VT1.5 actors 84, 168 DS1 actors 86 and up to 168 VT-X actors 88. The two STS-3 actors 80 are respectively incarnated by the SOI actors 58, one for each service OC-3link 14/16, and the two STS-3 actors 81 are respectively incarnated by the POI actors 60, one for each protection OC-3 link 26/28. Each STS-1 actor 82 has two parts, one incarnated by an SOI actor 58, and the other by an SMPR actor 54. The VT1.5 actors 84 and the DS1 actors 86 are incarnated by the NPC actors 62. The STS-3 actor groups 80 and 81 respectively correspond to the Optical Interfaces 12 and 24. The STS-1 actors 82 correspond in part to the service Optical Interface 12 and thus have an Oi_part 82a. Moreover, because the STS-1 signals are de-multiplexed from the STS-3signals, the STS-1 actors 82 also correspond in part to the service Mappers 18. Thus, the STS-1actors also have an Mpr_part 82b. The VT1.5 actors 84 and the DS1 actors 86 all correspond to the service Mappers 18. The VT-X actor 88 is a pseudo facility. It is only used when a VT1.5 actor 84 has not been created. This is because the SONET protocol requires that signals be monitored even when they are not equipped/defined. Once a VT1.5 actor 84 is created, it takes over the responsibility of its VT-X actor 88. The STS-3 and STS-1 actors of an unselected OC-3 link serve the same purpose. The STS-1 actor of an unselected trio of service Mappers 18 is not connected in any data path and is therefore not needed as a place holder.

The facility actors relate to each other as a transmission path is followed. Each service OC-3link 14/16 is supported by one STS-3 actor 80, which relates to three STS-1 actors 82. Each STS-1actor 82 is in turn related to 28 VT1.5 actors 84 and 28 DS1 actors 86. Each VT1.5 actor 84 has a corresponding DS1 actor 86. Each pair of VT1.5 and DS1 actors manipulates the same signals but from different protocol perspectives.

There can be many different types of facilities within each facility class. For example, there are many different possible DS1 signals. In order to create facility actors for these facilities types, it is preferable to use inheritance structures with the facility actors representing base classes) that capture commonalities, and newly created facility actors representing subclasses that implement variabilities. Because facilities are created dynamically when provisionable entities are restored, it is possible to dynamically incarnate a specific facility actor that only processes the facility's specific protocol. This has significant positive impact on design simplicity as well as run-time performance insofar as burdensome run-time type checking of facility actors is not needed.

ACTIVE ACTORS

As previously described, the HSU 2 handles single point failures by providing protection devices for different failure groups. Three failure groups were identified in the HSU 2; namely: The Optical Interface (OI) failure group, the Mapper (MPR) failure group, and the Formatter (FMT) failure group. The OI and FMT failure groups support 1:1 protection, and the MPR failure group supports 6:1 protection. In other words, the SOI and POI actors 58/60, the SMPR and PMPR actors 54/56, and the FMT1 and FMT1 actors 50/52 are fault-tolerant provisionable entities.

Although both service entities and protection entities are provisionable and can be restored to service independently, the system must select between a service entity and its protection entity for actual data transmission. In other words, the system needs which one of the two Optical Interfaces 12/24, which one of the two Formatters 20/32, and which six of the seven Mapper Devices 18/30 should be included in the transmission paths.

Figure 8:
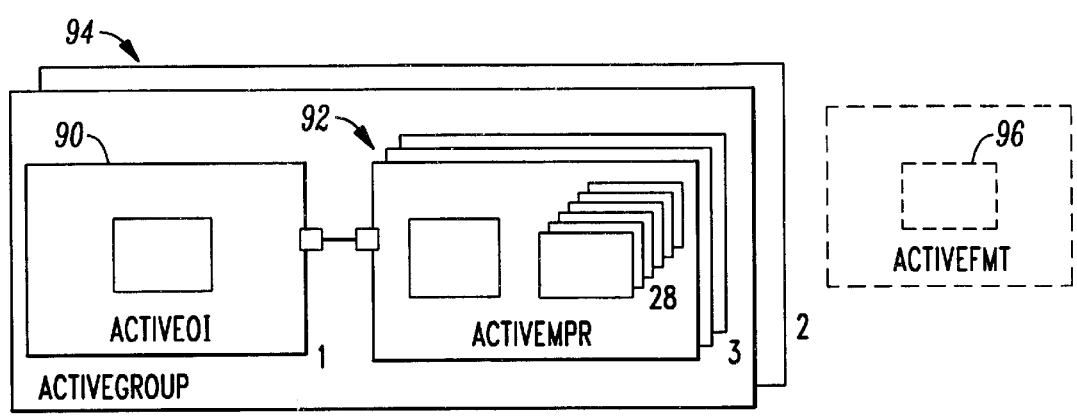
FIG. 8 is a functional block diagram showing software objects representing active actors in the signal processing unit of FIG. 1.
Figure 9:
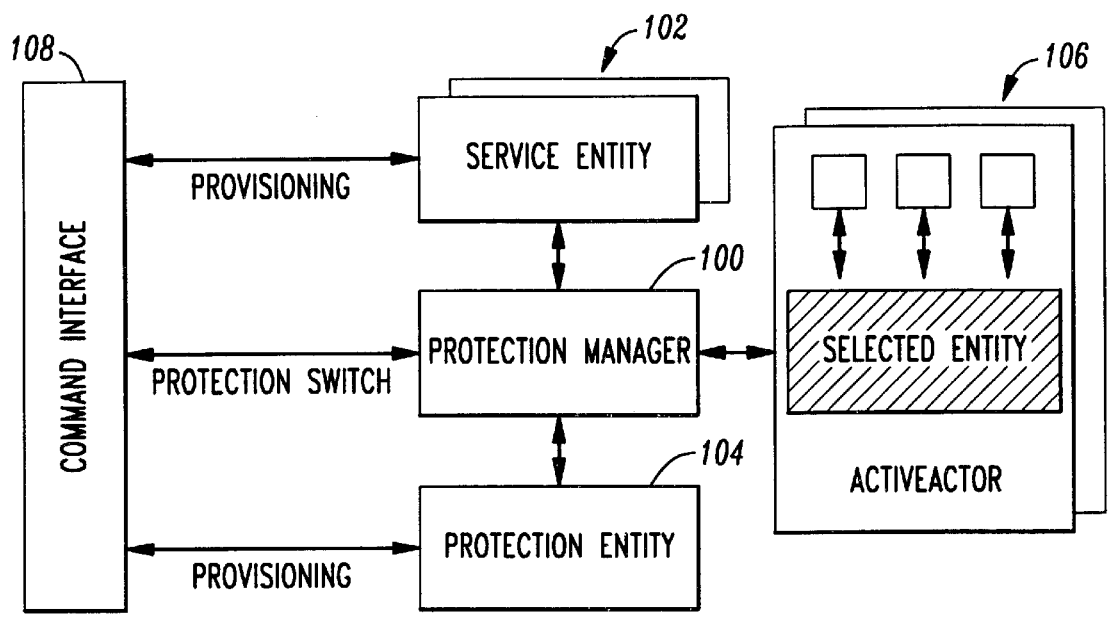
FIG. 9 is a functional block diagram showing the use of a software object representing a protection switch manager actor.

To model this concept, another set of actors is introduced, known as "active actors," for each selected entity. As shown in FIG. 8, an active Optical Interface (Active Oi) actor 90 contains a reference to either the SOI actor 58 or the POI actor 60. Similarly, three active Mapper (ActiveMpr) actors 92 each contain a reference to either one of the SMPR actors 54 or the PMPR actor 56. Of course, at most one ActiveMpr actor 92 may reference the PMPR 56 at a time. Each ActiveMpr actor 92 also has 28 references to 28 corresponding NPC actors 62. As a consequence, the NPC actors are dynamically linked to the selected SMPR or PMPR actor referenced by the ActiveMpr actor 92. That is, the 28 NPC actors 62 referenced in an ActiveMpr actor 92 use the transmission devices of the SMPR actor 54 or PMPR actor 56 referenced by the same ActiveMpr actor 92. The operations of the 28 NPC actors 62 are not affected when a protection switch occurs between an SMPR actor 54 and the PMPR actor 56 because their relationship with the ActiveMpr actor 92 does not change. Even if the NPC actors 62 were not part of the ActiveMpr 92, they could still obtain the correct MPR reference from the Active Group actor 94 described below. Indeed, it is the function of the active actors to provide such references.

An Active Group container actor (ActiveGroup) 94 is used to group each ActiveOi actor 90 and its three ActiveMpr actors 92 (and their associated NPC actors) together. There are two such groups, one for each active OC-3 link, as shown in FIG. 8. As also shown in FIG. 8, there could be an active Formatter (ActiveFmt) actor 96 that contains a reference to either the FMT0 actor 50 or the FMT1 actor 52. However, it is also possible to allow all the MPR actors (i.e., the SMPR actors 54 and the PMPR actor 56) to communicate with both Formatter actors regardless of which is being selected.

The active actors provide a layer of encapsulation and thus simplify the logic of other actors that need to interact with selected provisionable entities. When a protection switch is requested, the active actors are responsible for importing/deporting the appropriate actors specified by the switch request, thus bringing the selected entity into a working context so as to be connected to other objects. In the past, many protection switching functions required non-trivial run-time calculations to decide which provisionable entities were being selected. Potential race conditions could develop when an interaction was initiated before the global data for the protection state finished being updated. In accordance with the present invention, other system actors only interact with the active actors and do not need to know whether a protection switch has occurred. The active actors shield the internal events and guarantee the completion of state changes.

PROTECTION MANAGERS

The protection managers are the actors responsible for carrying out protection switches. They are the only actor that knows the state of the provisional entities that they control. This control is maintained via the provisional entity actors. Thus, as shown in the generalized block diagram of FIG. 9, a protection manager 100 is bound to a group of service entity actors 102 (failure group) and a protection entity actor 104. The protection manager 100 is also bound to an active actor group (ActiveActor) 106. A command interface 108 represents software associated with the MC 42 and the CI 44 that communicates with the service and protection entity actors 102/104, and with the protection manager 100. As to the former, the command interface 108 issues provisioning requests. As to the latter, the command interface 108 issues manual protection switch commands input by system administrators. When such command is received, the protection manager 100 may accept or deny the request based on its knowledge of the current state of the service and protection entity actors 102/104. The protection manager 100 also receives and responds to protection requests issued by the service and protection entity actors 102/104 (e.g., when a hardware error or a network problem occurs). Upon receiving such a request, the protection manager 100 sends out a state inquiry to the protection entity actor 104. If it is available, a switch is triggered. The protection manager 100 then enters a switching state before the switch completes. If another switching request is made during this time period, the request is immediately denied. Once the protection switch is complete, the protection information is stored by the protection manager 100. This allows the protection manager 100 to know whether a service entity is being protected so that it can react to subsequent switching requests quickly. Advantageously, the protection manager 100 does not need to keep track of the states of provisionable entities or syncrohronize to those states. The only information the protection manager 100 knows is whether or not a protection switch may be pursued for a given entity (i.e., if a protection entity is already protecting a service entity, a request from another service entity will be denied without further processing). The protection manager 100 also has the ability to broadcast the availability of protection to all service entities. This allows autonomous switches to be performed by any entity that has a need for protection and a protection entity is available. If protection is available, the switch is carried out after the protection manager receives a formal request.

Figure 10:
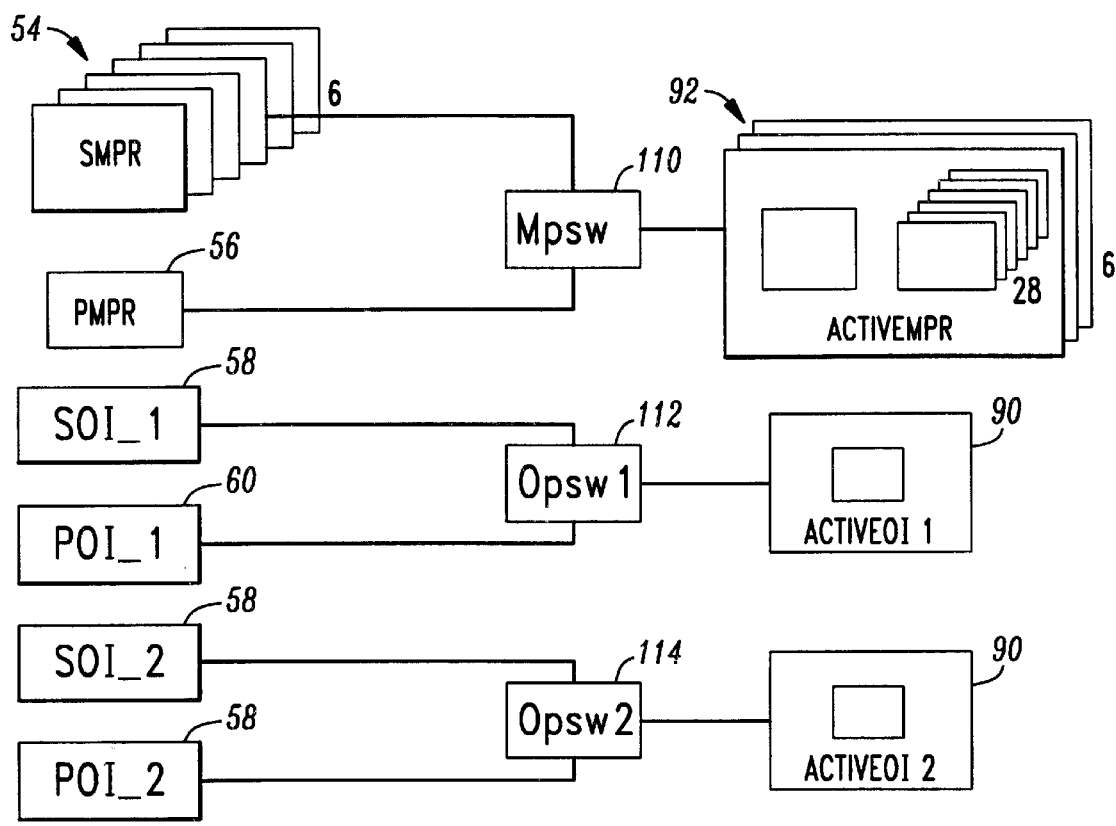
FIG. 10 is a functional block diagram showing protection manager actors in the signal processing unit of FIG. 1.

There is a protection manager (switch) actor for the Optical Interfaces 20/24 and the Mappers 18/30, but not for the Formatters 20/24 and the CCNs 22/34. This is because the Formatters failure group is part of the CCN failure group, which is switched under the control of the MC 42, as previously stated. FIG. 10 shows the protection manager actors for the Optical Interface and Mapper failure groups. A Mapper protection switch (Mpsw) actor 110 performs protection switches between one of the SMPR actors 54 and the PMPR actor 56. There are also two Optical Interface protection switch (Opsw1 and Opsw2) actors 112 and 114 (one for each OC-3 traffic stream entering the Optical Interfaces 12 and 24). The Opsw1 actor 112 switches between a first one of the SOI actors 58 (SOI_1) and a first one of the POI actors 60 (POI_1) (for a first OC-3 traffic stream). The Opsw2 actor 114 switches between a second one of the SOI actors 58 (SOI_2) and a second one of the POI actors 60 (POI_2) (for a second OC-3 traffic stream). Each of the protection manager actors communicates with the provisionable entities in its group, as well as the corresponding active actor. Thus, the Mpsw actor 110 communicates with the six ActiveMpr actors 92. Similarly, the Opsw1 actor 112 communicates with a first one of the ActiveOI actors 90 (ActiveOI_1) while the Ppsw2 actor 114 communicates with a second one of the ActiveOI actors 90 (ActiveOI_2). As previously stated, a protection manager handles both manual protection switches and autonomous switches triggered by hardware failures and network problems, and therefore eliminates the potential race conditions between the manual and autonomous switches existing in prior art protection switch implementations. The protection manager actors do not cause protection switches on their own. Requests are made either by a system administrator or by a provisionable entity actor that needs a protection switch. The provisionable entities may request protection based on their own conditions. The protection manager actor for that entity oversees the physical resources associated with the entity and determines if a protection switch should be initiated. When multiple requests occur at the same time, the protection manager actor makes the final decision based on its predefined logic.

The present invention deviates from prior art designs in which there is a complex central decision maker (i.e., the MC 42) for all types of protection switches. As stated, the MC only controls protection switching for the CCN failure group and its associated Formatter failure group. Moreover, in the present design, the service and protection entities are identical. Whether an entity is a protection or service entity is determined by the port of the protection manager actor through which it communicates. This is consistent with the physical view of the HSU 2 where a circuit pack is a protection pack if it is plugged into the protection slot, and it is a service pack if it is in the service slot. This allows the protection switch design to be simplified because only one set of code is sufficient for both service and protection entities. The design can also be easily extended to support a pool of protection entities, as in the case of NxM protection. Such a change only requires small changes to the protection manager. None of the other objects in the system will be affected.

ACTOR RELATIONSHIPS

Figure 11:
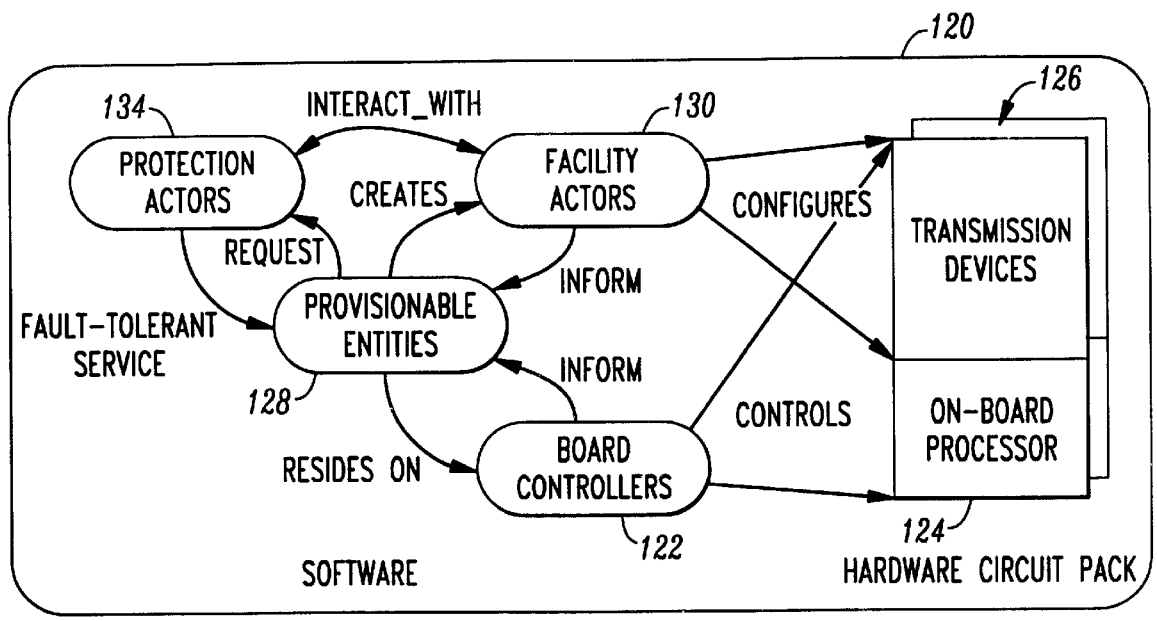
FIG. 11 is a functional block diagram showing software objects and hardware devices involved in protection switching in accordance with the invention.
Figure 12:
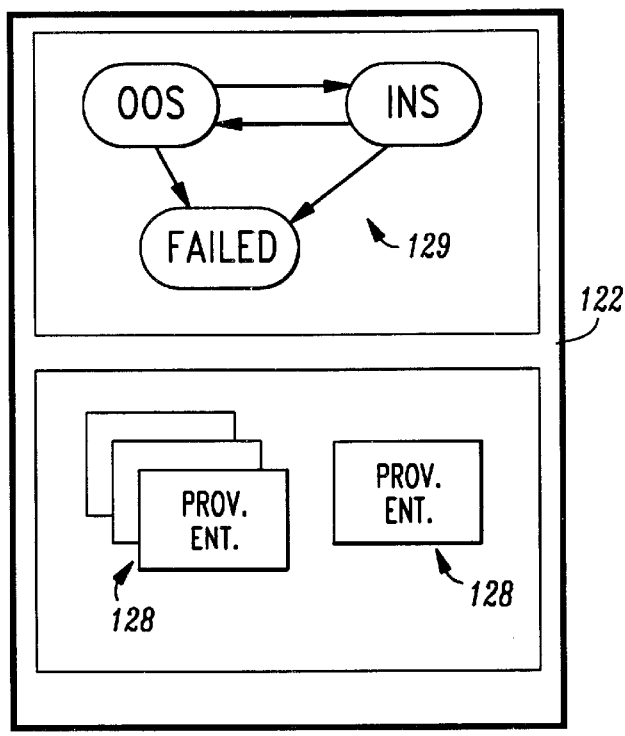
FIG. 12 is a functional block diagram showing a board controller actor object.

FIG. 11 shows the relationship among the various sub-domain actors described thus far and the hardware devices that could be associated with a Hardware Circuit Pack 120 in accordance with the invention. Board controllers, represented in software by Board Controller actors 122, are mainly responsible for On-Board Processors 124 of the Hardware Circuit Pack 120. They are also responsible for performing diagnostics of the Transmission Devices 126 of the Hardware Circuit Pack 120. The Board Controller actors 122 host the provisional entities, represented in software by Provisionable Entity actors 128. FIG. 12 illustrates this containment relationship using the software model of FIG. 2. FIG. 12 also illustrates (at reference numeral 129) the three board controller states (described earlier) using the state model of FIG. 3. The Board Controller actors 122 inform the contained Provisionable Entity actors 128 of board conditions. Conversely, the Provisionable Entity actors 128 can report their condition and request protection services if their associated provisionable entity has failed.

Figure 13:
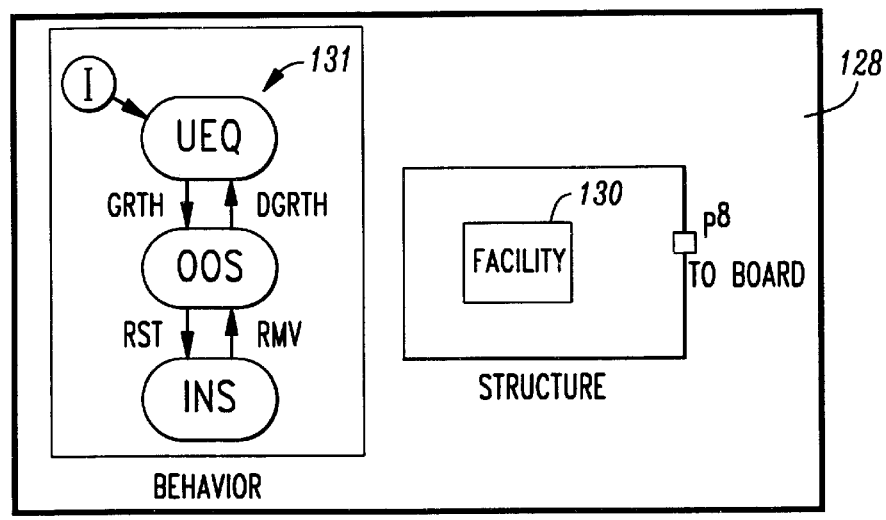
FIG. 13 is functional block diagram showing a provisionable entity actor object.

Based on the signals they process, the Provisionable Entity actors 128 create the correct Facility actors 130 that configure and manipulate the corresponding transmission devices. This containment relationship is shown in FIG. 13, which uses the software model of FIG. 2. As can be seen, a Facility actor 130 is contained within a Provisionable Entity actor 128. Also shown is a port "P8," which is used by the Provisionable Entity actor 128 to communicate with its containing Board Controller actor 122. FIG. 13 also illustrates (at reference numeral 131) the provisional entity states (described earlier) using the state model of FIG. 3.

Figure 14:
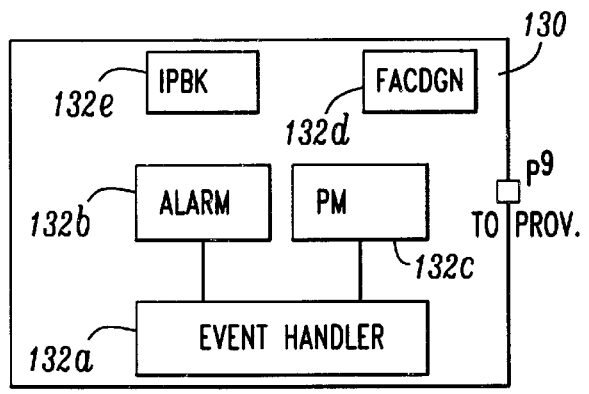
FIG. 14 is a functional block diagram showing a facility actor object.

The Facility actors 130 represent the transmission device side of the Hardware Circuit Pack 120. If the Hardware Circuit Pack 120 supports multiple facilities (such as multiple Mappers), each Facility actor 130 would be associated with only a subset of the devices. The Facility actors 130 also inform their corresponding provisionable entity of various transmission (e.g., network) conditions. FIG. 14 illustrates the components of a Facility actor 130 using the software model of FIG. 2. As can be seen, the Facility actor 130 communicates with its containing Provisionable Entity actor 128 through a port "P9." The Facility actor 130 further includes several processing elements 132; namely an "event handler" 132a, an "alarm unit" 132b, a performance monitor ("pm") 132c, a facilities diagnostic ("facdgn") unit 132d, and a loopback ("lpbk") diagnostic unit 132e.

The Protection actors 134 are peers of the Provisionable Entity actors 128 that provide the latter with fault-tolerant services. Via their relationship with the Provisionable Entity actors 128, the Protection actors 132 also interact with the contained Facility actors 130 to enable the latter to access the actual physical transmission device being selected at a particular instance.

Use of the foregoing sub-domain actors separates the software architecture into several different views. These are the hardware view, the system operational view, the fault-tolerance view, and the transmission view. Separating system components into sub-domains allows much flexibility.

For example, it allows developers to work on a single, well-defined area with specific domain knowledge. Those who are familiar with one area do not need to know everything about the digital cross-connect system 4 in order to be effective. The sub-domain paradigm also allows future hardware changes to be implemented without major impact to the software architecture. For example, if a hardware designer moves transmission devices between boards, only the facility actors and a small portion of the board controllers would be impacted. If processors are added/ deleted from a physical board, only the board controllers are impacted. Extra LEDs may also be added to the boards without impacting the majority of the system. Another advantage of using software sub-domains is that there can be quick implementation of different protocols/facilities using the same provisionable entities. For example, if the STM-1 protocol is used in lieu of or in addition to the OC-3 protocol, it is only necessary to derive another set of facilities to be created by the same set of provisionable entities. All other system actors can remain the same.

OBJECT DISTRIBUTION

In the discussion thus far, the software architecture of the HSU 2 has been described using a single processor model. That is, the architecture has been described without detailed reference to the underlying processors. Because a digital cross-connect system such as the Lucent DACS II™ product is a distributed system, the actors must be distributed between individual processors. Also, because the actors represent system entities, many of them must have representations on two or more processors in order to communicate with other local actors. For example, the provisionable entity actors must be consistent with each other, although each may carry out different responsibilities. In prior art architectures, two database records are maintained for the various HSU signal processing devices, one at the MC 42 and the other at the UC 40. There can also be distribution of actors between processors on different signal processing devices. For example, Facility actors should be distributed between the UC 40, the Optical Interfaces 12/24 and the Mappers 18/30.

Figure 15:
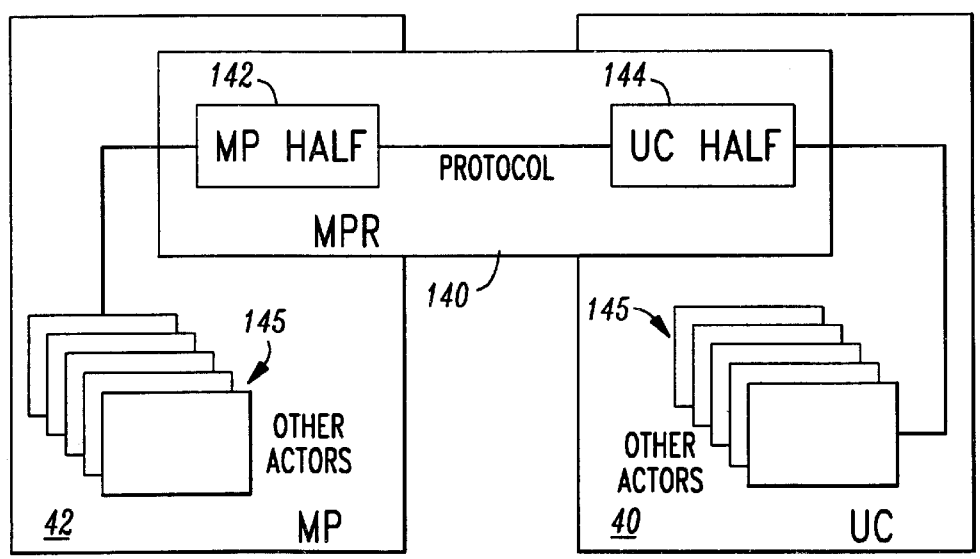
FIG. 15 is a functional block diagram showing a "Half-object Plus Protocol" distribution pattern.

To provide the required object distribution, a "Half-object Plus Protocol" distribution pattern is used. Each entity that needs multiple representations is divided into multiple parts with internal protocols defined among the half objects. FIG. 15 illustrates this approach relative to a Mapper provisionable entity actor (MPR) 140. The MPR actor 140 is divided into an MC-part MPR half object 142 and a UC-part MPR half object 144. Other actors 145 may be similarly distributed.

Figure 16:
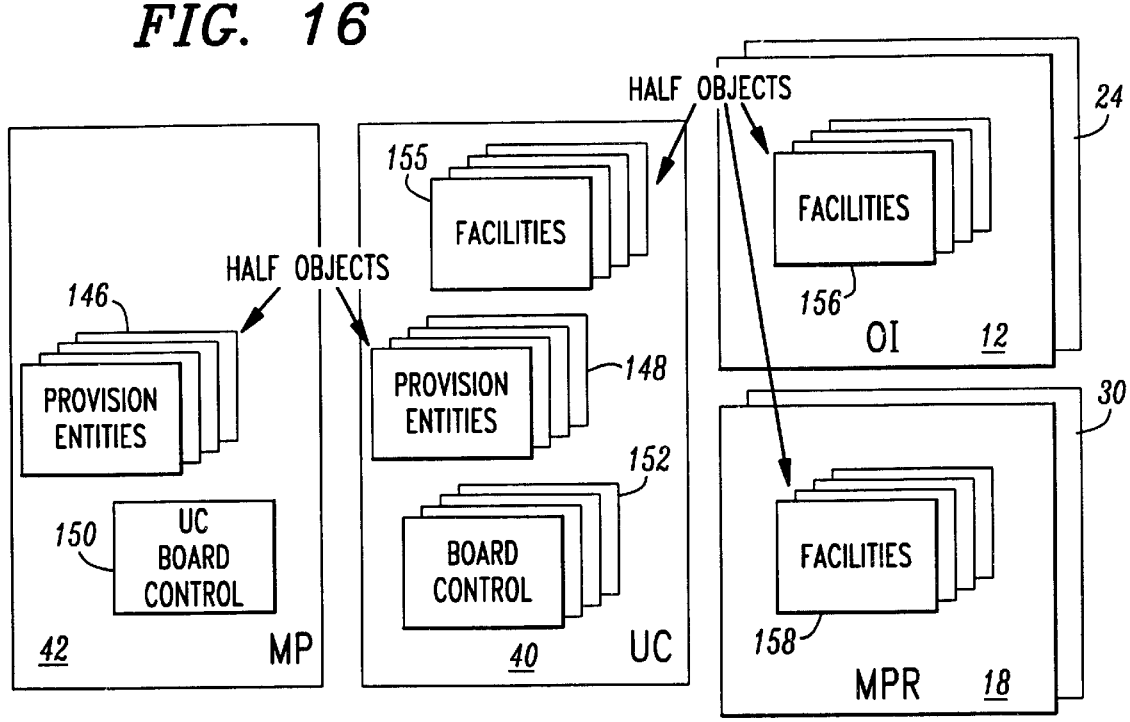
FIG. 16 is a functional block diagram showing plural object distributions in a distributed processor model of the invention.

FIG. 16 provides an overview of the above-described object distributions. As can be seen, the UC 40 and the MC 42 host respective half-objects 146 and 148 for each of the previously described provisionable entities. The MC 42 also hosts UC board controller object 150. The UC 40 hosts a group of board controller objects 152 that correspond to the Optical Interfaces 12/24, the Mappers 18/30 and the Formatters 20/32. Facility half-objects 155, 156 and 158 are respectively hosted by the UC 40, the Optical Interfaces 12/25 and the Mappers 18/30.

During software development, all of the half-objects may be contained in a higher level actor so as to maintain a high level architecture view. Once the architecture model has been stabilized, actors can be grouped together according to processor boundaries. The actors residing on the same processor will then be compiled together to generate the final executable code for each processor, as has been done in the past.

Figure 17:
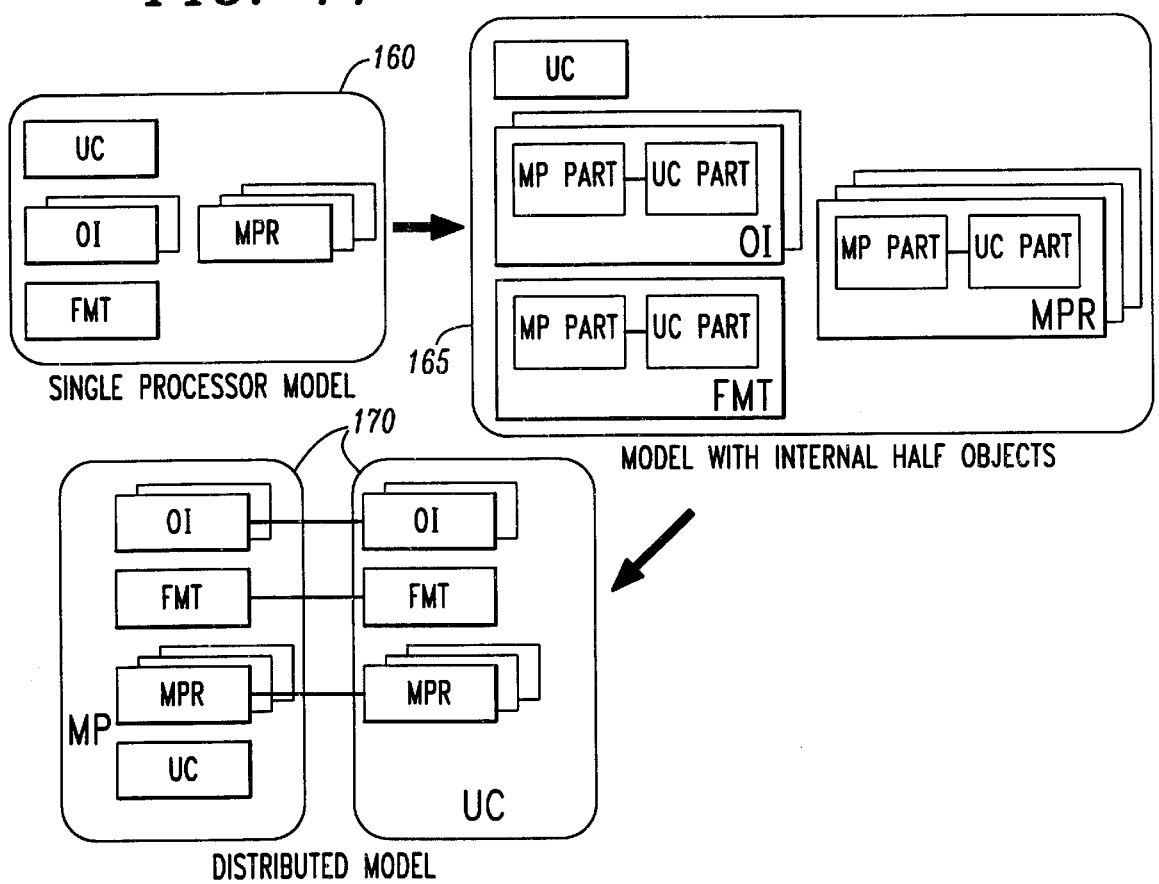
FIG. 17 is a functional block diagram showing a single-processor model and a distributed processor model of the invention.

FIG. 17 shows the different modeling stages for creating distributed actors. For the sake of simplicity, only a few provisionable actors are included. The first model 160 is a single processor model. It focuses on system structures such as what elements the system should include and how the elements should related to each other. Implementation details are omitted. The second model 165 includes internal half objects and takes the underlying processors into consideration. Actors are divided according to processor boundaries into half objects. The internal protocols are established for the half objects. Responsibilities of an actor in the single processor environment are shared by the half-objects. The half-objects collaborate to achieve the purpose of the original actor in the first model 160. The internal job division is invisible to other actors. The third model 170 is a fully distributed model. Actors are re-grouped according to their hosting processors. The relationships among the half objects are unchanged although they reside on different processors. Actors on one processor communicate to each other without knowing that others may have counterparts on other processors. For example, an Optical Interface half-object on the MC 42 may communicate with a Mapper half-object on the MC 42. It has no knowledge of other Mapper half-objects on other processors. Such encapsulation allows the adjustment of collaboration between half objects without impacting other actors.

Turning now to FIG. 18, the half-object division of protected provisionable entity actors is shown. All protected provisionable entities will have two separate parts: a UC part and an MC part. The protection managers for the protected entities also have a corresponding UC part and an MC part. Logically, every pair of the half objects will work together to perform the required actions, but they will be physically located on the MC 42 and the UC 40. FIG. 18 also shows the CI 40.

If each corresponding half object pair is designated as a container object, the logical relationship between the service entities, the protection entities, and the protection managers can be described. In FIG. 18, a container object 182 contains six MC-part SMpr half-objects 184 and six UC-part Mp_s half-objects 186 corresponding to the six service Mappers 18. Similarly, a container object 188 contains one MC-part PMpr half-object 190 and one UC-part Mpr_p half object 192 corresponding to the one protection Mapper 30. A container object 194 contains two MC-part OI_s half-objects 196 and two UC-part Oi_s half-objects 198 corresponding to the two OC-3 traffic streams processed by the service Optical Interface 12. Similarly, a container object 200 contains two MC-part OI_p half-objects 202 and two UC-part Oi_p half-objects 204 corresponding to the two OC-3 traffic streams processed by the protection Optical Interface 24.

Each failure group has only one protection manager (ProtMgr), and each ProtMgr container object will be responsible for coordinating the protection switch actions of the corresponding service and protection entity container objects (protection groups). A container object 206 contains an MC-part ProtMgr half-object 208 and a UC-part ProtMgr half-object 210. The ProtMgr half-objects 208 and 210 control PSW operations on behalf of the SMpr and Mpr_s half-objects 184/186 and the PMpr and Mpr_p half-objects 190/192. The ProtMgr half-object 206 also communicates with the active actors (ActiveMpr) 212. A container object 214 contains two MC-part ProtMgr half-objects 216 and two UC-part ProtMgr half-object 218. The ProtMgr half-objects 216 and 218 control PSW operations on behalf of the OI_s and Oi_s half-objects 196/198 and the OI_p and Oi_p half-objects 202/204. The ProtMgr half-object 214 also communicates with the active actors (ActiveOi) 220.

All PSW requests will be sent to a ProtMgr container object, to be handled by the UC part ProtMgr half object that is logically contained in the container object. The UC part ProtMgr half object will decide which entity is selected and protected. This information is maintained in the Active Entity Groups ActiveMgr 212 and ActiveOi 220, which index selected entities by logical entity number.

FIG. 19 illustrates a shared-memory mechanism that can be used for communication between pairs of half objects in which an actor 230 is assumed to have a UC-executable half actor 232 and an MC-executable half actor 234. The half actors 232 and 234 run in respective executable processes 236 and 238. These processes run in respective memory spaces 240 and 242 that overlap to provide a shared memory 244. The half actors 232 and 234 maintain a logical binding 246 and communicate through respective proxies 248 and 250. Other inter-processor communicaton mechanisms, such as LAN (Local Area Network) communication, could also be used.

Accordingly, a protection switch architecture for a digital cross connect system has been described. While various embodiments have been disclosed, it should be apparent that many variations and alternative embodiments could also be implemented. It is understood, therefore, that the invention is not to be in any way limited except in accordance with the appended claims.

What is claimed is:

1. In a digital cross-connect system having a main controller, a command interface, and at least one digital signal processing unit, a digital signal processing unit and integrated protection switch, comprising:

one or more signal processing service devices;

one or more signal processing protection devices corresponding to said service devices;

a unit controller; and a protection switch in said unit controller for switching signal processing responsibilities between said service devices and said protection devices, said protection switch being adapted to act independently of said main controller in response to autonomous protection requests from said service devices by completing all protection switching related to said protection requests without main controller involvement.

2. In a digital cross-connect system having a main controller, a command interface, and at least one digital signal processing unit, a digital signal processing unit and integrated protection switch, comprising:

one or more signal processing service devices;

one or more signal processing protection devices corresponding to said service devices;

a unit controller;

a protection switch in said unit controller for switching signal processing responsibilities between said service devices and said protection devices, said protection switch being adapted to act independently of said main controller in response to autonomous protection requests from said service devices by completing all protection switching related to said protection requests without main controller involvement; and wherein said protection switch is further adapted to perform manual protection switches in response to protection switching requests from said main controller.

3. In a digital cross-connect system having a main controller, a command interface, and at least one digital signal processing unit, a digital signal processing unit and integrated protection switch, comprising:

one or more signal processing service devices;

one or more signal processing protection devices corresponding to said service devices;

a unit controller;

a protection switch in said unit controller for switching signal processing responsibilities between said service devices and said protection devices, said protection switch being adapted to act independently of said main controller in response to autonomous protection requests from said service devices by completing all protection switching related to said protection requests without main controller involvement; and wherein said unit controller implements a software architecture that includes one or more service objects associated with said service devices, one or more protection objects associated with said protection devices, and one or more protection manager objects implementing said protection switch relative to said service objects and said protection objects.

4. An apparatus in accordance with claim 3 wherein said service objects and said protection objects include provisionable entity objects that provide software rentations of said service devices and said protection devices, said provisionable entity objects being responsive to provisioning requests issued by said protection manager objects as part of a protection switching operation to place said service devices and said protection devices in and out of service.

5. An apparatus in accordance with claim 4 wherein said service objects and said protection objects include board controller objects that provide software representations of circuit board hardware implementing said service devices and said protection devices, said board controller objects being adapted to initialize said board hardware, to download software to board hardware having local processing capability, to diagnose said board hardware upon request form said unit controller, and to notify said provisionable entity objects of conditions on said board hardware.

6. An apparatus in accordance with claim 5 wherein said service objects include facility objects that provide software representations of transmission signals carried by said service devices, said facility objects being adapted to configure transmission devices on said board hardware to support a desired transmission protocol, to perform performance monitoring, facility alarm detection and facility alarm processing, and to notify said provisionable entity objects of transmission conditions.

7. An apparatus in accordance with claim 6 wherein said software architecture includes active objects selectively representing one or more of said service devices or a corresponding one or more of said protection devices, depending on which is selected by said protection switch, said active objects being adapted to provide a mechanism for interacting with the selected one of more of said service devices or said protection devices without requiring knowledge as to which has been selected by said protection switch.

8. An apparatus in accordance with claim 7 wherein said software architecture includes an active group object containing plural ones of said active objects representing service devices or protection devices in a defined failure group.

9. An apparatus in accordance with claim 3 wherein said provisionable entity objects and said protection manager objects each include a main controller half-object residing in said main controller and a unit controller half-object residing in said unit controller.

10. An apparatus in accordance with claim 9 wherein said unit controller protection manager half-object is responsible for implementing autonomous and manual protection switching operations and said main controller protection manager half-object is responsible for forwarding manual protection requests to said unit controller protection manager half object.

11. In a digital cross-connect system having a main controller, a command interface, and at least digital signal processing unit, the digital signal processing unit including one or more signal processing service devices, one or more signal processing protection devices corresponding to said service devices, and a unit controller, a method for performing protection switching between said service devices and said protection devices, comprising:

receiving protection requests from said service devices at said unit controller;

performing protection switching between said service devices and said protection devices in response to said protection requests, said protection switching being performed by said unit controller autonomously of said main controller by completing all protection switching related to such protection requests without main controller involvement; and reporting protection switching status to said main controller.

12. In a digital cross-connect system having a main controller, a command interface, and at least one digital signal processing unit, the digital signal processing unit including one or more signal processing devices, one or more signal processing protection devices corresponding to said service devices, and a unit controller, a method for performing protection switching between said service devices and said protection devices, comprising:

receiving protection requests from said service devices at said unit controller;

performing protection switching between said service devices and said protection devices in response to said protection requests, said protection switch being performed by said unit controller autonomously of said main controller by completing all protection switching related to said protection requests without main controller involvement;

reporting protection switching status to said main controller; and receiving manual protection switching requests from said main controller at said unit controller and performing protection switches in response thereto autonomously of said main controller.

13. In a digital cross-connect system having a main controller, a command interface, and at least one digital signal processing unit, the digital signal processing unit including one or more signal processing devices, one or more signal processing protection devices corresponding to said service devices, and a unit controller, a method for performing protection switching between said service devices and said protection devices, comprising:

receiving protection requests from said service devices at said unit controller;

performing protection switching between said service devices and said protection devices in response to said protection requests, said protection switch being performed by said unit controller autonomously of said main controller by completing all protection switching related to said protection requests without main controller involvement;

reporting protection switching status to said main controller; and wherein said reporting step includes a first reporting step wherein said unit controller advises said main controller that an autonomous protection switching operation is being initiated by said unit controller, and a second reporting step wherein said unit controller advises said main controller that an autonomous protection switching operation has been completed by said unit controller.

14. In a digital cross-connect system having a main controller, a command interface, and at least one digital signal processing unit, a digital signal processing unit and integrated protection switch, comprising:

one or more signal processing service devices;

one or more signal processing protection devices corresponding to said service devices;

a unit controller;

a protection switch in said unit controller for switching signal processing responsibilities between said service devices and said protection devices, said protection switch being adapted to act independently of said main controller in response to autonomous protection requests from said service devices by completing all protection switching related to said protection requests without main controller involvement;

said protection switch being further adapted to perform manual protection switches in response to protection switching requests from said main controller;

said unit controller implementing a software architecture that includes one or more service objects associated with said service devices, one or more protection objects associated with said protection devices, and one or more protection manager objects implementing said protection switch relative to said service objects and said protection objects;

said service objects and said protection objects including provisionable entity objects that provide software representations of said service devices and said protection devices, said provisionable entity objects being responsive to provisioning requests issued by said protection manager objects as part of a protection switching operation to place said service devices and said protection devices in and out of service;

said service objects and said protection objects further including board controller objects that provide software representations of circuit board hardware implementing said service devices and said protection devices, said board controller objects being adapted to initialize said board hardware, to download software to board hardware having local processing capability, to diagnose said board hardware upon request from said unit controller, and to notify said provisionable entity objects of conditions on said board hardware;

said service objects further including facility objects that provide software representations of transmission signals carried by said service devices, said facility objects being adapted to configure transmission devices on said board hardware to support a desired transmission protocol, to perform performance monitoring, facility alarm detection and facility alarm processing, and to notify said provisionable entity objects of transmission conditions;

said software architecture also including active objects selectively representing one or more of said service devices or a corresponding one or more of said protection devices, depending on which is selected by said protection switch, said active objects being adapted to provide a mechanism for interacting with the selected one of more of said service devices or said protection devices without requiring knowledge as to which has been selected by said protection switch; and said software architecture further including an active group object containing plural ones of said active objects representing service devices or protection devices in a defined failure group.

15. An apparatus in accordance with claim 14 wherein said provisionable entity objects and said protection manager objects each include a main controller half-object residing in said main controller and a unit controller half-object residing in said unit controller, said unit controller protection manager half-object being responsible for implementing autonomous and manual protection switching operations and said main controller protection manager half-object being responsible for forwarding manual protection requests to said unit controller protection manager half object.

16. A computer program product for use in a digital cross-connect system having a main controller, a command interface, and at least digital signal processing unit, the digital signal processing unit including one or more signal processing service devices, one or more signal processing protection devices corresponding to said service devices, and a unit controller, a method for performing protection switching between said service devices and said protection devices, said computer program product comprising:

a data storage medium;

means recorded on said data storage medium for receiving protection requests from said service devices at said unit controller;

means recorded on said data storage medium for performing protection switching between said service devices and said protection devices in response to said protection requests, said protection switching being performed by said unit controller autonomously of said main controller by completing all protection switching related to such protection requests without main controller involvement; and means recorded on said data storage medium for reporting protection switching status to said main controller.

17. An apparatus in accordance with claim 1 wherein said unit controller is adapted to report an occurrence of a protection switching operation to said main controller following implementation of said protection switching operation by said unit controller.

18. An apparatus in accordance with claim 17 wherein the said unit controller is adapted to perform a local database update operation upon occurrence of a protection switching operation, and wherein said main controller is adapted to perform a synchronizing main database update operation following receipt of a report from said unit controller of said protection switching operation.

19. A method in accordance with claim 11 further including said unit controller performing local database update operations upon occurrences of said protection switching.

20. A method in accordance with claim 19 further including said main controller performing synchronizing main database update operations following reports from said unit controller of said protection switching operations.

* * * * *